(12) United States Patent
Shaw et al.

(10) Patent No.: US 11,673,511 B2
(45) Date of Patent: Jun. 13, 2023

(54) HITCH CONNECTABLE MOTORCYCLE TRANSPORT

(71) Applicant: Shaw & Sons, Inc., Costa Mesa, CA (US)

(72) Inventors: Ronald D. Shaw, Costa Mesa, CA (US); Evan Shaw, Costa Mesa, CA (US)

(73) Assignee: Shaw & Sons, Inc., Costa Mesa, CA (US)

( * ) Notice: Subject to any disclaimer, the term of this patent is extended or adjusted under 35 U.S.C. 154(b) by 0 days.

(21) Appl. No.: 17/703,892

(22) Filed: Mar. 24, 2022

(65) Prior Publication Data
US 2022/0212607 A1    Jul. 7, 2022

Related U.S. Application Data

(63) Continuation of application No. 17/149,295, filed on Jan. 14, 2021, now abandoned, which is a continuation of application No. 16/583,807, filed on Sep. 26, 2019, now abandoned, which is a continuation of application No. 15/819,846, filed on Nov. 21, 2017, now abandoned.

(51) Int. Cl.
*B60R 9/10* (2006.01)
*B60R 9/06* (2006.01)
*B66F 9/18* (2006.01)

(52) U.S. Cl.
CPC ............... *B60R 9/10* (2013.01); *B60R 9/06* (2013.01); *B66F 9/18* (2013.01)

(58) Field of Classification Search
CPC .......... A01M 31/02; B66B 9/187; B66B 9/16; B66F 9/18; B66F 7/04; B60P 1/4428; B60P 3/122; B60P 1/4421; B60P 3/07; B60R 9/06; B60R 9/10; A61G 7/1046; B66D 1/12; Y10S 187/90; E21B 7/027; E21B 7/028

See application file for complete search history.

(56) References Cited

U.S. PATENT DOCUMENTS

| | | | |
|---|---|---|---|
| 2,187,283 A | 1/1940 | Scheutz |
| 3,088,545 A | 5/1963 | Meyer |
| 3,367,427 A | 2/1968 | Baumgardner |
| 3,837,513 A | 9/1974 | Adamek |
| 4,252,492 A | 2/1981 | Scothern |
| 4,262,773 A | 4/1981 | Basham |
| 4,593,883 A | 6/1986 | Nelson |
| 4,695,218 A | 9/1987 | Boyer |

(Continued)

*Primary Examiner* — Gregory W Adams
(74) *Attorney, Agent, or Firm* — Stetina Brunda Garred and Brucker (57) ABSTRACT

A lift for a motorcycle, with the lift being useable with a hitch receiver. The lift comprises a connector engageable with the hitch receiver, and a guide rail having a first end portion coupled to the connector and a second end portion opposite the first end portion. A carriage is operatively coupled to the guide rail and is traversable between a first position and a second position, the carriage moving toward the second end portion of the guide rail as the carriage moves from the first position toward the second position. A platform is coupled to the carriage and is engageable with the motorcycle and capable of supporting the weight of the motorcycle when engaged therewith and as the carriage is moved from the first position toward the second position, causing the motorcycle to be lifted from the ground.

15 Claims, 4 Drawing Sheets

(56) References Cited

U.S. PATENT DOCUMENTS

| | | |
|---|---|---|
| 4,741,660 A | 5/1988 | Kent |
| 4,862,997 A | 9/1989 | Eberle |
| 4,987,976 A | 1/1991 | Daugherty |
| 5,363,925 A | 11/1994 | Gallagher |
| 5,489,110 A | 2/1996 | Van Dusen |
| 5,567,107 A | 10/1996 | Bruno |
| 5,595,265 A | 1/1997 | Lebrocquy |
| 6,007,290 A | 12/1999 | Schulz |
| 6,640,934 B1 | 11/2003 | Edwards |
| 7,416,215 B1 | 8/2008 | Rosario |
| 7,686,562 B2 | 3/2010 | Panzarella |
| 7,686,592 B2 | 3/2010 | Inoue |
| 7,798,760 B2 | 9/2010 | Strassman |
| 8,132,997 B2 | 3/2012 | Reuille |
| 8,235,644 B2 | 8/2012 | DiGiovanni |
| 8,316,994 B1 | 11/2012 | Rands |
| 9,127,509 B2 | 9/2015 | Robinson |
| 10,266,123 B1 | 4/2019 | Faynor |
| 2004/0195285 A1 | 10/2004 | Pinard |
| 2008/0264990 A1 | 10/2008 | Riegert |
| 2010/0272548 A1 | 10/2010 | McKamey |
| 2013/0142602 A1 | 6/2013 | Barnts |

HITCH CONNECTABLE MOTORCYCLE TRANSPORT

CROSS-REFERENCE TO RELATED APPLICATIONS

The present application is a continuation of U.S. patent application Ser. No. 17/149,295, filed on Jan. 14, 2021, which is a continuation of U.S. patent application Ser. No. 16/583,807, filed on Sep. 26, 2019, which is a continuation of U.S. patent application Ser. No. 15/819,846, filed on Nov. 21, 2017, the entire contents of which are incorporated herein by reference.

STATEMENT RE: FEDERALLY SPONSORED RESEARCH/DEVELOPMENT

Not Applicable

BACKGROUND

1. Technical Field

The present disclosure relates generally to a motorcycle transport device, and more specifically, to a lift connectable to a hitch receiver on a vehicle for lifting a motorcycle and supporting the motorcycle during transport.

2. Description of the Related Art

Various types of motorcycles are commonly driven for recreational purposes. Standard motorcycles are typically used in a recreational manner on road trips, while dirt bikes may be used for off-road enjoyment on a dirt path or track. Such dirt paths or tracks may be located in a remote location, and thus, transport of the dirt bike from its place of storage to the remote location may be required.

In view of the size and weight of conventional dirt bikes, transport thereof typically requires the use of a trailer or truck bed large enough to allow the dirt bike to be parked thereon. Although the use of the trailer or truck bed provides a suitable means to transport a dirt bike, the use of trailers and truck beds is also associated with several deficiencies.

A first deficiency is that the use of a truck bed or trailer requires either a truck (in the case of a truck bed) or a vehicle large enough to tow a trailer. Oftentimes, trailers are large and bulky, and thus, may not be suitable for smaller vehicles, such as sedans. Furthermore, towing a trailer tends to add difficulty to the driving, as the trailer extends the effective length of the vehicle, and also pivots relative to the vehicle.

Another deficiency is that truck beds and trailers typically include an elevated platform upon which the dirt bike may be parked during transport. Given the weight and bulk associated with conventional dirt bikes, it is uncommon to simply lift the dirt bike onto such elevated platform. Rather, ramps or tracks may be used to transfer the dirt bike onto the elevated platform. However, the ramps or tracks may be difficult or dangerous to use, and may add extra weight and bulk to the vehicle.

Accordingly, there is a need in the art for a device that allows for easier transport of a motorcycle. Various aspects of the present disclosure address this particular need, as will be discussed in more detail below.

BRIEF SUMMARY

In accordance with one embodiment of the present disclosure, there is provided a lift for a motorcycle, with the lift being useable with a hitch receiver. The lift comprises a connector engageable with the hitch receiver, and a guide rail having a first end portion coupled to the connector and a second end portion opposite the first end portion. A carriage is operatively coupled to the guide rail and is traversable between a first position and a second position, the carriage moving toward the second end portion of the guide rail as the carriage moves from the first position toward the second position. A platform is coupled to the carriage and is engageable with the motorcycle and capable of supporting the weight of the motorcycle when engaged therewith and as the carriage is moved from the first position toward the second position, causing the motorcycle to be lifted from the ground.

The carriage may include an opening, and the guide rail may be received within the opening.

The lift may include a first bearing coupled to the carriage and interfacing with a first side of the guide rail. The lift may additionally include a second bearing coupled to the carriage in opposed relation to the first bearing, with the second bearing interfacing with a second side of the guide rail opposite the first side of the guide rail.

The platform and the carriage may comprise at least a portion of a support assembly, and the lift may further include a spool coupled to the guide rail and rotatable relative to the guide rail about a rotation axis, and a cable operatively coupled to the spool and the support assembly. The cable may define an exposed portion as that portion of the cable extending between the spool and the support assembly, the exposed portion of the cable decreasing as the carriage moves from the first position toward the second position, the exposed portion of the cable increasing as the carriage moves from the second position toward the first position.

The lift may additionally include an electric motor coupled to the spool to effectuate rotation of the spool. The lift may additionally include an electric connector coupled to the electric motor and connectable to an electrical port on a vehicle to electrically connect the electric motor to an electronic power source on the vehicle. The lift may further comprise a controller in operative communication with the electric motor, the controller being capable of receiving manual inputs from a user to allow for user control of the electric motor.

The lift may include a crank lever coupled to the spool to effectuate manual rotation of the spool.

According to another aspect of the present disclosure, there is provided method of transporting a motorcycle, the method comprising the steps of supporting a motorcycle on a lift having a carriage moveable along a rail, and moving the carriage of the lift along the rail to raise the motorcycle off the ground.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a hitch-mountable motorcycle lift and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, wherein the showings are for illustrating a preferred embodiment of the present disclosure, and not for purposes of limiting the same, there is depicted an embodiment of a hitch mountable motorcycle lift 10, e.g., "lift," for use with a motorcycle 12 for transporting the motorcycle 12 behind a vehicle. In this regard, the lift 10 may be engageable with a conventional hitch receiver connected to the vehicle. The lift 10 may include a portion which may be lowered to extend under the motorcycle 12. That portion of the lift 10 may be raised to lift the motorcycle 12 off the ground. The motorcycle 12 may be secured to the lift 10 to allow for transport of the motorcycle 12 with the vehicle. To unload the motorcycle 12, the lift 10 may be lowered to allow the motorcycle to be removed from the lift 10. As such, the use of the lift 10 may eliminate the need to drive the motorcycle up a ramp, or manually raise the motorcycle onto a transport device. Furthermore, the lift 10 may also eliminate the need for a separate wheel-supported trailer towed behind the vehicle. As such, the lift 10 provides an easy-to-use mechanism for transporting a motorcycle 12.

As used herein, the word "motorcycle" is used to broadly refer to two-wheeled vehicles, including dirt bikes, mopeds, bicycles, scooters, or other two-wheeled vehicles known in the art. Furthermore, although the exemplary embodiment described herein and shown in the Figures refers to a motorcycle, it is understood that various implementations of the present disclosure may be used for other vehicles, such as all-terrain vehicles (ATV), which may include more than two wheels.

According to one embodiment, the lift 10 generally includes a first assembly 14 engageable with a hitch receiver 16 connected to a vehicle 18, and a second assembly 20 engageable with the motorcycle 12 and moveable relative to the first assembly 14. In this respect, the first assembly 14 generally comprises that portion of the lift 10 that remains substantially stationary relative to the vehicle 18 during use of the lift 10, while the second assembly 20 generally comprises that portion of the lift 10 that remains substantially stationary relative to the motorcycle 12 during use of the lift 10.

The first assembly 14 comprises a connector 22 engageable with the hitch receiver 16. In this regard, the connector 22 is sized and structured to be complimentary to the hitch receiver 16. A conventional hitch receiver 16 includes a quadrangular sleeve having a receiver opening sized to receive a similarly sized shaft. As such, the connector 22 may include a shaft 24 sized and structured to be received into the receiver opening of the hitch receiver 16. The connector shaft 24 may be quadrangular and be sized to frictionally engage the quadrangular sleeve of the hitch receiver 16 when inserted into the receiver opening. The quadrangular sleeve of the hitch receiver 16 may come in different sizes, with common sizes being 1.25 inches×1.25 inches, as well as 2 inches×2 inches, and thus, the connector shaft 24 may be sized accordingly.

The connector shaft 24 may be hollow and include a pair of opposed openings, which may be aligned with a corresponding pair of openings formed in the quadrangular sleeve of the hitch receiver 16 upon insertion of the connector shaft 24 into the receiver opening. A pin 26 may be inserted through the aligned pairs of openings to secure the connector shaft 24 to the quadrangular sleeve of the hitch receiver 16. The connector shaft 24 may be of a length that is long enough to extend out of the quadrangular sleeve of the hitch receiver 16 by a sufficient distance to avoid interference between the lift 10 and the rear of the vehicle 18.

A guide rail 28 is coupled to the connector shaft 24 and defines a guide axis 30. The guide rail 28 includes a first end portion 32 coupled to the connector 22, with the guide rail 28 extending away from the connector 22 and terminating at a second end portion 34 opposite the first end portion 32. In one embodiment, the guide rail 28 is generally perpendicular to the connector 22, and may include a brace 36 or other support to strengthen the interconnection between the guide rail 28 and the connector 22.

It is also contemplated that in one particular embodiment, the guide rail 28 may be pivotally connected to the connector 22 to allow for a certain degree of pivotal movement of the guide rail 28 relative to the connector 22. Such pivotal movement may accommodate opening of a liftgate or tailgate on the vehicle 18, without requiring removal of the lift 10 from the hitch receiver 16. In one embodiment, the guide rail 28 may pivot approximately 45 degrees relative to the connector 22 between its generally upright, perpendicular orientation, and the lowered orientation.

The first assembly 14 may additionally include a spool 38 coupled to the guide rail 28 adjacent the second end portion 34 thereof. A cover 40 may be positioned over a portion of the spool 38 to at least partially conceal the spool 38 and protect against objects inadvertently becoming lodged in the spool 38. The spool 38 is rotatable relative to the guide rail 28 in a first rotational direction and an opposing second rotational direction. Rotation of the spool 38 may be effectuated through an operative interconnection with an electric motor 42 and/or a hand crank 44. The spool 38 may be operatively coupled to a cable 46, as will be described in more detail below.

As noted above, the first assembly 14 is operatively connected to the second assembly 20, which includes a carriage 48 translatable relative to the guide rail 28 along the guide axis 30. In the exemplary embodiment, the carriage 48 is a four-sided structure having an opening sized to receive the guide rail 28. The size of the opening in the carriage 48 is larger than the guide rail 28 so as to minimize interference between the guide rail 28 and the carriage 48 as the carriage 28 traverses along the guide rail 28. Along these lines, the carriage 48 may be traversable along the guide rail 28 between a first position and a second position, which may be associated with raising and lowering the motorcycle 12. In particular, as the carriage 48 moves from the first position toward the second position, the carriage moves from the first end portion 32 of the guide rail 28 toward the second end portion 34 of the guide rail 28, and thus, such movement may be associated with raising the motorcycle 12 off the ground. Conversely, as the carriage 48 moves from the second position toward the first position, the carriage 48 moves from the second end portion 34 of the guide rail 28 toward the first end portion 32 of the guide rail 28, and thus, such movement may be associated with lowering of the motorcycle 12 onto the ground.

Figures 1, 2:
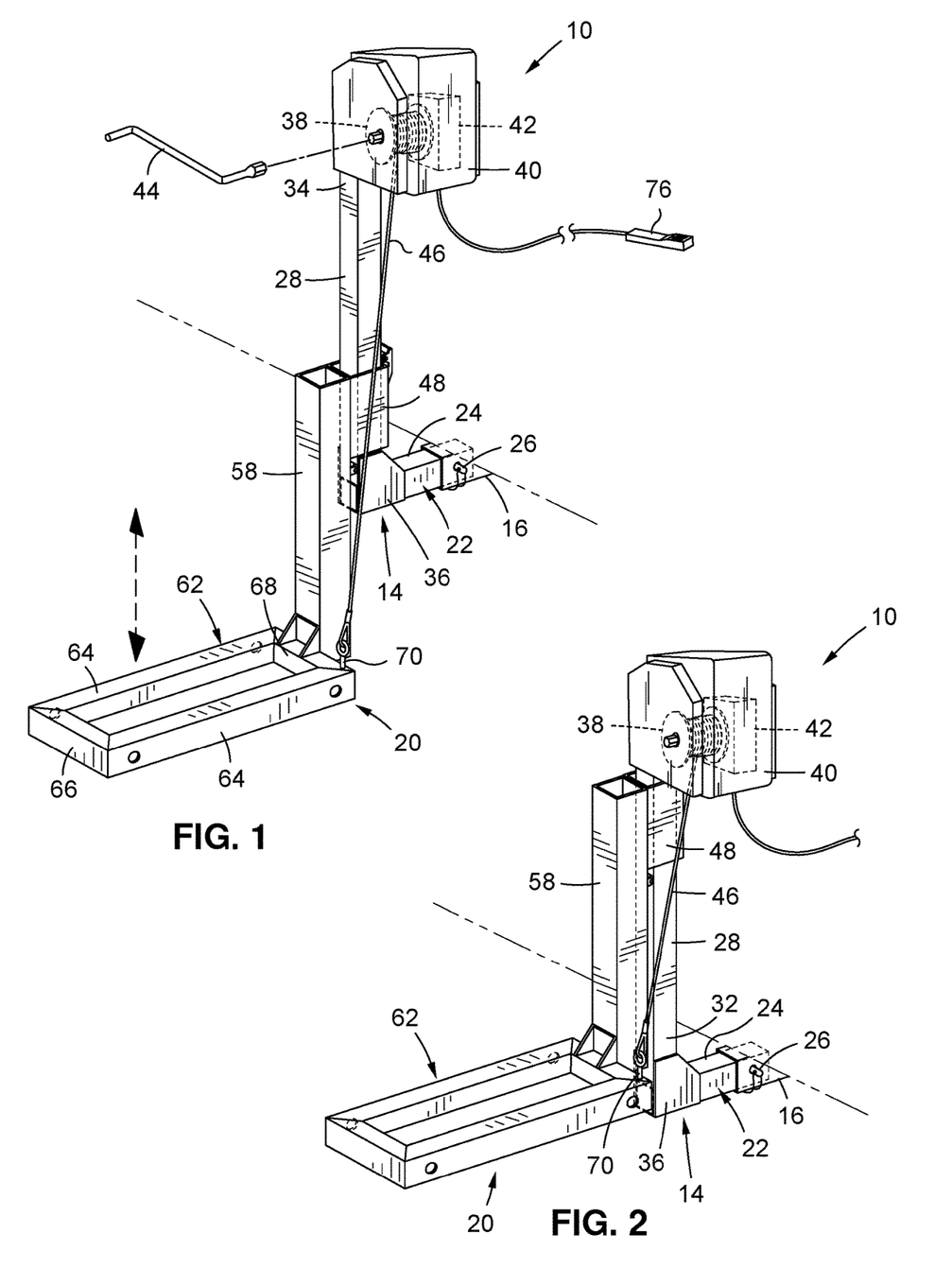
FIG. 1 is an upper perspective view of a hitch mountable motorcycle lift in a lowered configuration.
FIG. 2 is an upper perspective view of the hitch mountable motorcycle lift in a raised configuration.
Figures 3, 4:
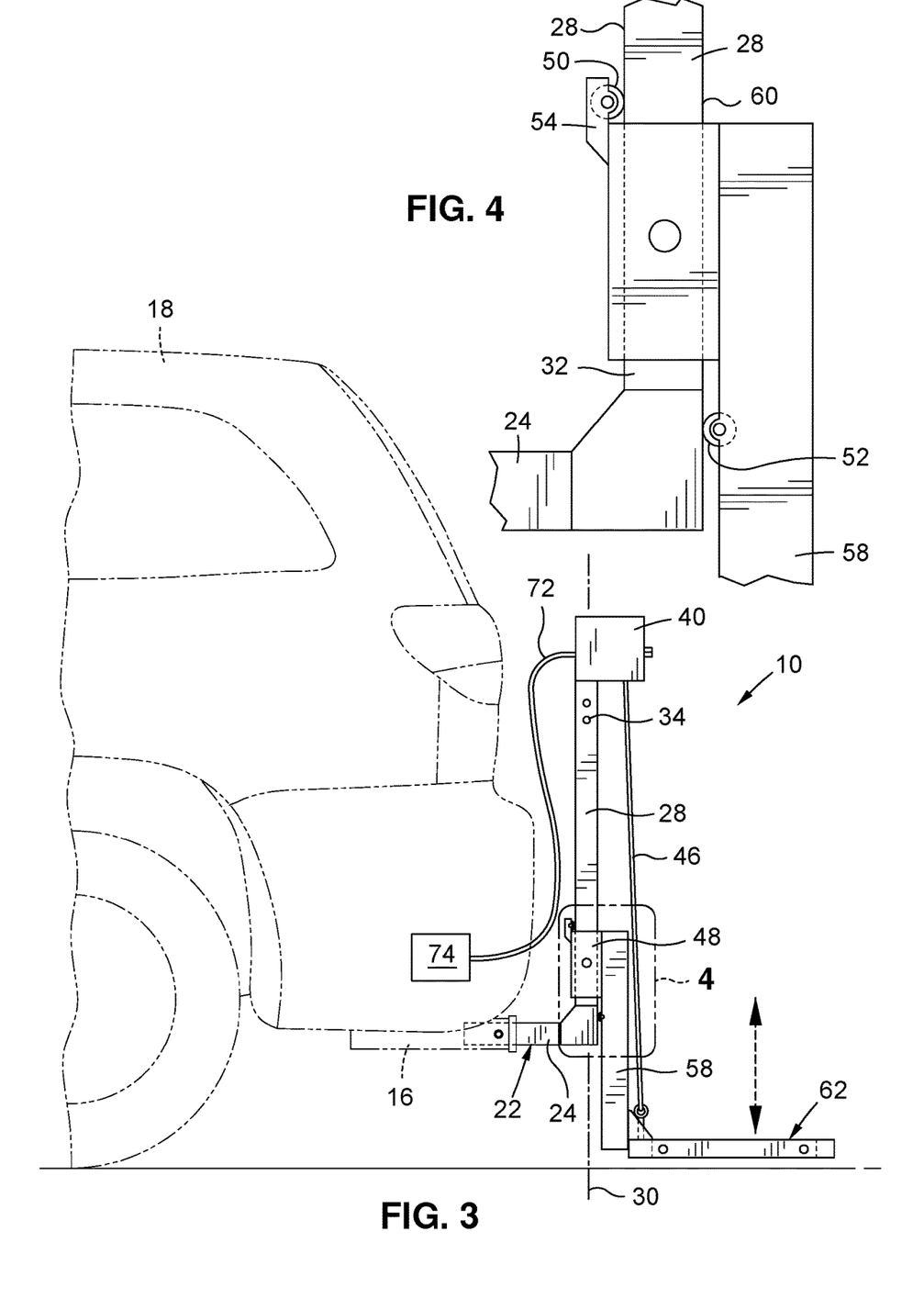
FIG. 3 is a side view of the hitch mountable motorcycle lift connected to a vehicle depicted in phantom.
FIG. 4 is an enlarged side view of a portion of the hitch mountable motorcycle lift depicting a pair of opposed roller bearings.

In order to minimize binding between the carriage 48 and the guide rail 28, and to provide for smooth travel of the carriage 48 along the guide rail 28, one embodiment of the lift may include at least one bearing. Referring now specifically to FIG. 4, there is depicted an enlarged, partial side view of the lift 10 showing a pair of roller bearings forming part of the second assembly 20. More specifically, first and second bearings 50, 52 are both coupled to the carriage 48 and are positioned adjacent opposed ends of the carriage 48 and interface with opposing surfaces of the guide rail 28. The first bearing 50 is coupled to the carriage 48 via an upper extension element 54 and is located above the carriage 48 and interfaces with a first side 56 of the guide rail 28. The second bearing 52 is coupled to the carriage 48 via an extension arm 58 in opposed relation to the first bearing 50, so as to interface with a second side 60 of the guide rail 28, which is opposite the first side 56 of the guide rail 28. The first and second bearings 50, 52 may roll relative to both the carriage 48 and the guide rail 28 as the carriage 48 moves along the guide rail 28.

A platform 62 is coupled to the carriage 48 and is moveable with the carriage 48 as the carriage 48 moves along the guide rail 28. In particular, the platform 62 is connected to the extension arm 58 and is engageable with the motorcycle 12. The platform 62 is capable of supporting the weight of the motorcycle 12 when engaged with the motorcycle 12 and the carriage 48 is lifted, i.e., the carriage 48 is moved from the first position toward the second position.

As shown in FIGS. 1-6, the platform 62 includes a generally quadrangular configuration, including a pair of side members 64, a front member 66, and a rear member 68. The rear member 68 is connected to the extension arm 58, and the pair of side members extend from the rear member 68. The front member 66 extends between the side members 64 opposite the rear member 68. The platform 62 may be sized and structured to interface directly with a skid plate on the motorcycle 12, or other structure located at a central location on the motorcycle 12, e.g., between the wheels on the motorcycle 12. Along these lines, the pair of side members 64 are spaced from each other by a distance such that the lateral sides of the side members 64 are separated by a distance that is less than the minimum distance between the pair of wheels to allow the platform 62 to extend under the body of the motorcycle 12. Furthermore, the front member 66 is separated from the rear member 68 by a distance such that a forward edge of the front member 66 extends beyond the motorcycle 12 when the motorcycle 12 is engaged with the platform 62.

Movement of the second assembly 20 relative to the first assembly 14 may be effectuated by the spool 38 and cable 46. In particular, the cable 46 may extend from the spool 38 to a mount 70 coupled to the platform 62. The cable 46 may define an exposed portion as that portion of the cable 46 extending between the spool 38 and the first assembly, particularly, the portion of the first assembly to which the cable 46 is mounted. The exposed portion of the cable 46 decreases as the carriage 48 moves from the first position toward the second position, and conversely, the exposed portion of the cable 46 increases as the carriage 48 moves from the second position toward the first position. Thus, by unwinding the cable 46 from the spool 38, the platform 62 may be lowered, and by winding the cable 46 around the spool 38, the platform 62 may be raised.

Rotation of the spool 38, and thus, movement of the platform 62 may be controlled via the electric motor 42. The motor 42 may impart a driving force on the spool 38 to allow the spool to rotate in the first rotational direction and the second rotational direction. Thus, the motor 42 may have sufficient power to raise and lower conventional motorcycles 12 supported on the platform 62.

According to one embodiment, the motor 42 is connected to a power cord 72 that may be plug connectable to an electrical connector 74 associated with the vehicle. For instance, the power cord 72 may connect with a plug commonly provided on vehicles to provide power to a trailer towed by the vehicle. The power cord 72 may include an adapter to adapt the power from the power bus of the vehicle to the power requirements of the motor 42. It is also contemplated that the motor 42 may be battery powered, solar powered, or powered through other means known in the art.

The lift 10 may further comprise a controller 76 in operative communication with the electric motor 42. The controller 76 is capable of receiving manual inputs from a user to allow for user control of the electric motor 42. The controller 76 may be hand-holdable, and may allow the user to enter control commands for raising or lowering the platform 62.

As an alternative or supplement to the motor 42, rotation of the spool 38 may be controlled by the hand crank 44, which may allow a user to manually impart a force on the spool 38 for rotating the spool 38 in either the first or second rotational directions. The hand crank 44 may include a socket or end that engages with an axle associated with the spool 38 for imparting the force to the spool 38.

Although the exemplary embodiment shows a spool 38 and cable 46 for raising and lowering the platform 62, it is contemplated that other mechanisms for controlling the position of the platform 62 may also be used. For instance, a rack and pinion mechanism can be used to move the platform 62 along the guide rail 28.

With the basic structure of the lift 10 described above, the following discussion relates to an exemplary use of the lift 10. The lift 10 is mounted to the vehicle 18 by inserting the connector 22 into the hitch receiver 16. Pin 26 or other locking mechanism may be used secure the lift to the hitch receiver 16.

To place a motorcycle 12 on the lift 10, the platform 62 is lowered to assume its first position, either through the use of the motor 42 or hand crank 44. In particular, the motor 42 or hand crank 44 is used to rotate the spool 38 in a manner which increases the length of the exposed portion of the cable 46, which results in the platform 62 being lowered.

Figure 5:
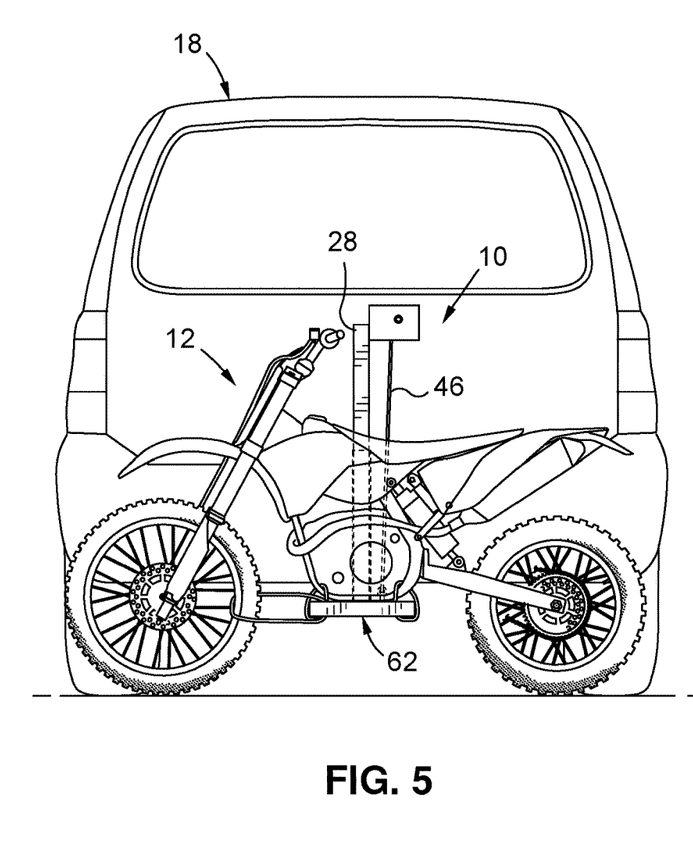
FIG. 5 is a front view of the hitch mountable motorcycle lift in a lowered configuration and engaged with a motorcycle.
Figure 6:
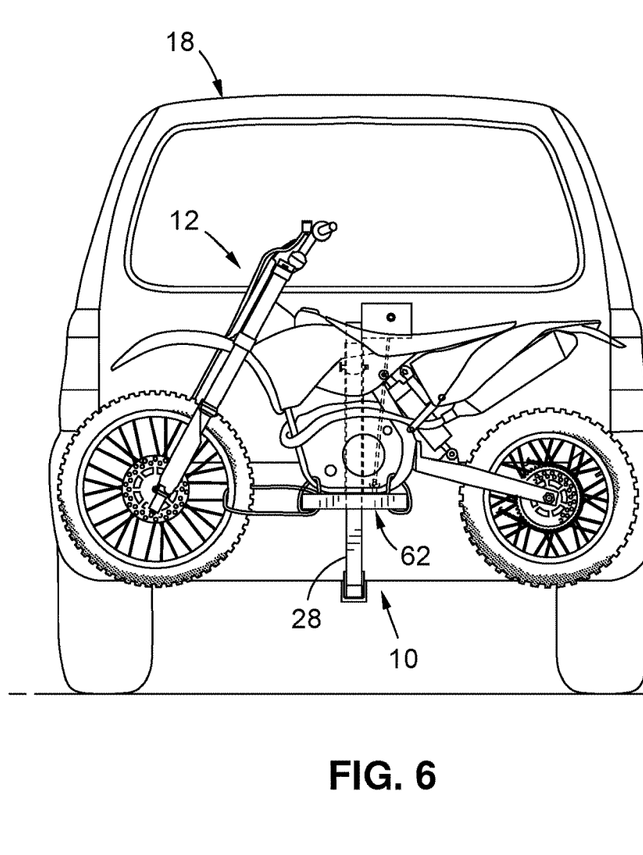
FIG. 6 is a front view of the hitch mountable motorcycle lift in a raised configuration and engaged with a motorcycle.

Once the platform 62 is lowered, the motorcycle 12 is positioned over the platform 62, with the platform 62 being positioned between the wheels of the motorcycle 12. When the motorcycle 12 is properly aligned over the platform 62, the platform 62 may be raised toward the motorcycle 12 by rotating the spool 38 to decrease the length of the exposed portion of the cable 46. When the platform 62 is close to the motorcycle 12, or shortly after contact is made with the motorcycle, but preferably before the wheels of the motorcycle have been lifted off the ground, the motorcycle 12 may be secured to the platform 62. Such securement may include the use of straps, bungee cords, ropes, locks, tie-downs, or other securing devices known in the art. As shown in FIGS. 5 and 6, one strap is used to secure the front wheel to the platform 62, while a pair of straps are used to connect the main body of the motorcycle 12 to the platform 62. The use of the straps in the Figures is intended to merely provide an exemplary illustration of the use of straps, and is not intended to limit the scope of the present disclosure. In this regard, other tie-down configurations may be used.

Once the motorcycle 12 is secured to the platform 62, the platform 62 may be raised to the second position, i.e., the fully raised position. In this position, the wheels of the motorcycle 12 may be raised off the ground by a sufficient distance to provide clearance during movement of the vehicle to which the lift 10 is attached. Furthermore, the weight of the motorcycle 12 is completely supported by the platform 62, i.e., no part of the weight is supported by the wheels of the motorcycle 12.

To unload the motorcycle 12 from the lift 10, the platform 62 is lowered until the wheels of the motorcycle 12 touch the ground. At that point, the straps or other securement members used to secure the motorcycle 12 to the lift 10 may be disconnected. The platform 62 may be completely lowered, until the motorcycle 12 is no longer supported by the platform 62.

The lift 10 provides a desirable alternative to conventional methods of transporting a motorcycle, with such conventional methods typically requiring ramps or tracks used to drive a motorcycle onto a bed of a truck or trailer. Indeed, the lift 10 may eliminate the need for a trailer or truck bed altogether. Furthermore, the lift 10 can engage with the motorcycle 12 while the motorcycle 12 is on the ground, and as such, does not require ramps or tracks. Rather, the lift 10 may be used with any vehicle having a hitch receiver, which may include sedans and SUVS, in addition to pickup trucks.

Figure 7:
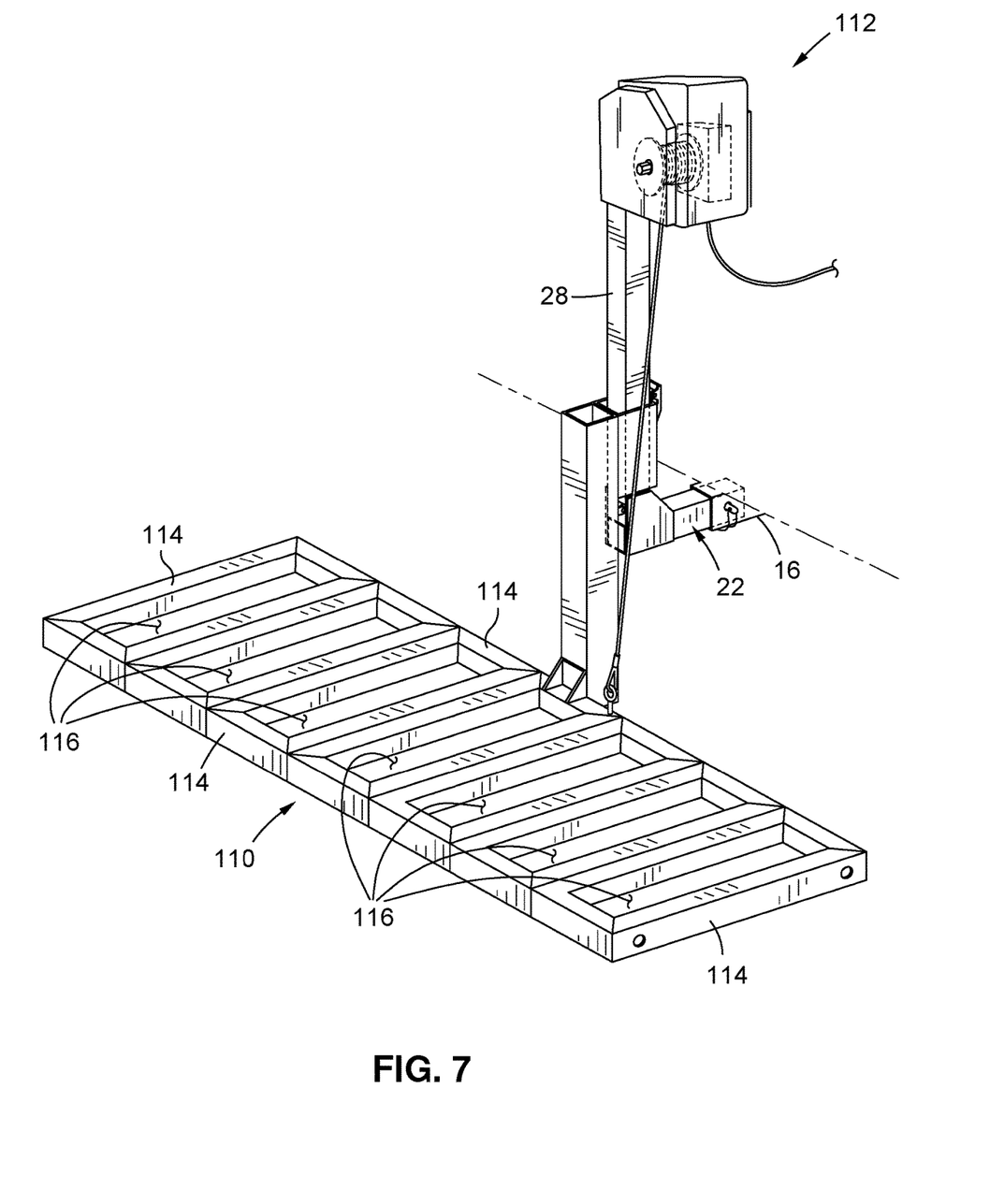
FIG. 7 is an upper perspective view of an embodiment of a hitch mountable motorcycle lift having a platform sized and structured to engaged with the tires on a motorcycle.

Referring now to FIG. 7, there is depicted an alternative embodiment of a platform 110 incorporated into lift 112. All other portions of the lift 112 are identical to that described above, and thus, the following discussion will focus solely on the platform 110.

The platform 110 is wider than the platform depicted in FIGS. 1-6, and is designed to interface with the wheels on the motorcycle 12 when supporting the motorcycle 12. The platform 110 includes a plurality of support members 114 which define a plurality of openings 116 adapted to interface with a respective wheel of the motorcycle 12. For instance, the front wheel of the motorcycle 12 may be seated within a first opening, while the rear wheel of the motorcycle 12 may be seated within a second opening. It is contemplated that other embodiments of the platform 110 may be formed without openings, and instead, may include other structures which engage with the wheels of the motorcycle, such as a wheel rack.

The platform 110 engages directly with the wheels of the motorcycle 12, rather than the body of the motorcycle 12. As such, the motorcycle 12 may be driven or otherwise rolled onto the platform 110.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A lift for a motorcycle, the lift being useable with a hitch receiver mounted to a motor vehicle, the lift comprising:
    a connector engageable with the hitch receiver;
    a guide rail having a first end portion coupled to the connector and a second end portion opposite the first end portion;
    a carriage operatively coupled to the guide rail and traversable between a first position and a second position, the carriage moving toward the second end portion of the guide rail as the carriage moves from the first position toward the second position, wherein the carriage comprises a four-sided structure having an opening sized to receive the guide rail, the guide rail being received within the opening;
    a first bearing located above the four-sided structure of the carriage and coupled to the carriage via an upper extension thereof, the first bearing interfacing with a first side of the guide rail and having a diameter greater than a clearance between the guide rail and the opening of the four-sided structure at the first side of the guide rail;
    a second bearing located below the four-sided structure of the carriage and coupled to the carriage via a lower extension arm thereof in opposed relation to the first bearing, the lower extension arm extending parallel to the guide rail, the second bearing interfacing with a second side of the guide rail opposite the first side of the guide rail and having a diameter greater than a clearance between the guide rail and the opening of the four-sided structure at the second side of the guide rail; and
    a platform coupled to the lower extension arm of the carriage and engageable with the motorcycle and capable of supporting the weight of the motorcycle when engaged therewith and as the carriage is moved from the first position toward the second position, causing the motorcycle to be lifted from the ground.

2. The lift recited in claim 1, the platform and the carriage comprising at least a portion of a support assembly, the lift further comprising:
    a spool coupled to the guide rail and rotatable relative to the guide rail about a rotation axis; and
    a cable operatively coupled to the spool and the support assembly, the cable defining an exposed portion as that portion of the cable extending between the spool and the support assembly, the exposed portion of the cable decreasing as the carriage moves from the first position toward the second position, the exposed portion of the cable increasing as the carriage moves from the second position toward the first position.

3. The lift recited in claim 2, further comprising an electric motor coupled to the spool to effectuate rotation of the spool.

4. The lift recited in claim 3, further comprising an electric connector coupled to the electric motor and connectable to an electrical port on a vehicle to electrically connect the electric motor to an electronic power source on the vehicle.

5. The lift recited in claim 3, further comprising a controller in operative communication with the electric motor, the controller being capable of receiving manual inputs from a user to allow for user control of the electric motor.

6. The lift recited in claim 2, further comprising a crank lever coupled to the spool to effectuate manual rotation of the spool.

7. A hitch-mountable lift for lifting a first vehicle, the hitch-mountable lift comprising:
a first assembly engageable with a hitch receiver and including a rail; and
a second assembly engageable with the first vehicle and including a sleeve defining an opening sized to receive the guide rail, the rail extending through the opening, the first and second assemblies being moveable relative to each other, with the sleeve moving along the rail, wherein the second assembly further includes a first bearing located above the sleeve and coupled to the sleeve via an upper extension extending therefrom, the first bearing interfacing with a first side of the rail and having a diameter greater than a clearance between the rail and the opening of the sleeve at the first side of the rail, and a second bearing located below the sleeve and coupled to the sleeve via a lower extension arm extending therefrom in opposed relation to the first bearing, the lower extension arm extending parallel to the rail, the second bearing interfacing with a second side of the rail opposite the first side of the rail and having a diameter greater than a clearance between the rail and the opening of the sleeve at the second side of the rail;
wherein the second assembly includes a platform, coupled to the lower extension arm, capable of supporting the weight of the first vehicle thereon when engaged therewith and as the second assembly is moved relative to the first assembly, causing the first vehicle to be lifted from the ground.

8. The hitch-mountable lift recited in claim 7, further comprising:
a spool coupled to the rail and rotatable relative to the rail about a rotation axis; and
a cable operatively coupled to the spool and the second assembly, the cable defining an exposed portion as that portion of the cable extending between the spool and the second assembly, the exposed portion of the cable decreasing as the second assembly moves toward the spool, the exposed portion of the cable increasing as the second assembly moves away from the spool.

9. The hitch-mountable lift recited in claim 8, further comprising an electric motor coupled to the spool to effectuate rotation of the spool.

10. The hitch-mountable lift recited in claim 9, further comprising a controller in operative communication with the electric motor, the controller being capable of receiving manual inputs from a user to allow for user control of the electric motor.

11. The hitch-mountable lift recited in claim 9, further comprising an electric connector coupled to the electric motor and connectable to an electrical port on a second vehicle to electrically connect the motor to an electronic power source on the second vehicle.

12. The hitch-mountable lift recited in claim 8, further comprising a crank lever coupled to the spool to effectuate manual rotation of the spool.

13. A method of transporting a motorcycle on a motor vehicle having a trailer hitch receiver, the method comprising the steps of:
supporting a motorcycle on a lift comprising:
a connector engageable with the trailer hitch receiver;
a guide rail having a first end portion coupled to the connector and a second end portion opposite the first end portion;
a carriage operatively coupled to the guide rail and traversable between a first position and a second position, the carriage moving toward the second end portion of the guide rail as the carriage moves from the first position toward the second position, wherein the carriage comprises a four-sided structure having an opening sized to receive the guide rail, the guide rail being received within the opening;
a first bearing located above the four-sided structure of the carriage and coupled to the carriage via an upper extension thereof, the first bearing interfacing with a first side of the guide rail and having a diameter greater than a clearance between the guide rail and the opening of the four-sided structure at the first side of the guide rail;
a second bearing located below the four-sided structure of the carriage and coupled to the carriage via a lower extension arm thereof in opposed relation to the first bearing, the lower extension arm extending parallel to the guide rail, the second bearing interfacing with a second side of the guide rail opposite the first side of the guide rail and having a diameter greater than a clearance between the guide rail and the opening of the four-sided structure at the second side of the guide rail; and
a platform coupled to the lower extension arm of the carriage and engageable with the motorcycle and capable of supporting the weight of the motorcycle when engaged therewith and as the carriage is moved from the first position toward the second position, causing the motorcycle to be lifted from the ground; and
moving the carriage along the rail to raise the motorcycle off the ground.

14. The method recited in claim 13, wherein the moving step includes actuating a motor coupled to the carriage to move the carriage along the rail.

15. The method recited in claim 14, wherein the moving step includes rotating a crank lever operatively coupled to the carriage to move the carriage along the rail.

* * * * *